United States Patent Office 2,977,279
Patented Mar. 28, 1961

2,977,279

COPPER CHELATE COORDINATION COMPLEXES

Milton Kosmin, Dayton, Ohio, assignor to Monsanto Chemical Company, St. Louis, Mo., a corporation of Delaware No Drawing. Filed Nov. 29, 1955, Ser. No. 549,887

13 Claims. (Cl. 167—22)

This invention relates to copper coordination complexes. More particularly, it relates to novel chelate coordination complexes of copper salts with N-alkenyl-alkylenepolyamines which are useful biological toxicants and are particularly effective fungicides.

In cupric coordination complexes with amines, the central copper atom can form up to four coordination, i.e., covalent, non-ionic bonds with the amino nitrogen atoms of the organic amino compound. The presently useful amines contain from three to five amino nitrogen atoms which can be linked to a copper atom by covalent bonds, each nitrogen atom being linked to an adjacent nitrogen atom by an alkylene chain. The resultant copper coordination complexes thus contain ring systems formed by the central copper atom, the nitrogen atoms covalently bonded to the copper atom, and the alkylene chain linking the nitrogen atoms, and may be described as metal chelates. The chelate bonding of a tetramine with a copper atom is illustrated, e.g., by the following schematic structure

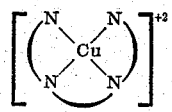

The ionic valences of the copper atom are not satisfied by covalent bonds with an uncharged molecule such as the present N-alkenylalkylenepolyamines, and thus produce a charge of +2 for the total complex ion, as shown above. The corresponding neutral salt is the compound [Cu(tetramine)]X, where X represents anions having a valence of −2.

When a copper salt forms a chelate complex of the present type with a polyamine containing less than four amino nitrogen atoms, the coordination bonds of the copper atom may not be completely satisfied by the polyamine compound. Thus, for example, when a copper salt is reacted with a triamine to form a coordination complex, there are available in a molecule of the triamine only three amino nitrogen atoms which can form covalent bonds with the four potential coordination bonds of the copper atom. In this case, the fourth coordination position of the copper atom may either be occupied by a covalently bonded molecule of another compound, e.g., another nitrogen compound such as another molecule of the amine or ammonia, or an oxygen-containing molecule such as water (derived, for example, from the solvent medium), or else the fourth coordination position may be occupied by an ionically-charged univalent atom or radical.

The first case may be represented by the schematic formula

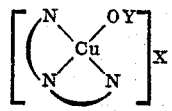

where X represents anions having a valence of −2, as above, and OY represents a covalently bonded molecule of an oxygen-containing compound such as water or an alcohol. Instead of molecules of an oxygen compound occupying the unfilled coordination positions, the copper atom might alternatively form covalent bonds with other molecules capable of coordinating with it, such as nitrogen-containing molecules, e.g., ammonia, to form complexes such as [Cu(triamine)(NH$_3$)]X.

The second case of coordination complexes of cupric atoms with polyamines of less than four amino nitrogen atoms is, as noted above, that in which the coordination bonds of the copper atom not satisfied by the amino nitrogen of the polyamine molecule are attached to charged, univalent atoms or radicals. When an ionically-charged univalent atom or radical is bonded to a copper atom of a coordination complex by a covalent, non-ionic bond, the total valence of the complex ion changes. As illustrated above, there is a charge of +2 on the ion formed by coordination of the cupric atom by each of its four coordination bonds with a neutral molecular compound such as a polyamine, oxygen compound, etc. When an ion or radical with a valence of −1 forms a covalent bond with a copper atom, the other three coordination bonds of which are satisfied by bonds with one or more molecular compounds as, e.g., in the present copper-triamine complexes, the overall valence of the complex ion formed then becomes +1 instead of +2. This type of complex is illustrated by the following schematic structure of the copper triamine complex ion:

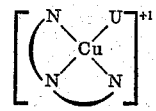

where U represents a univalent atom or radical such as a chlorine atom.

When the present N-alkenylalkylenepolyamine copper complexes are formed from a polyamine containing less than four amino nitrogen atoms, whether any coordination positions of the copper atom, not bonded to amino nitrogen, form a covalent bond with an uncharged molecule or with a univalent ion or radical, depends on the reaction conditions, the affinity of the compounds and anions present for the copper atom, etc. Both types of complexes are contemplated by the present disclosure, which relates generically to the chelate coordination complexes of copper salts with N-alkenylalkylenepolyamines of the structure defined hereinbelow.

Also included in the scope of the present invention are the hydrates and alcoholates of the present coordination complexes formed, e.g., in their crystallization from water or alcohol wherein, according to present-day chemical theory, the oxygen-containing molecule is not bonded to the copper atom, but only included in the crystalline lattice structure.

It is to be understood, further, that the structural formulas given above are only hypothetical, and while furnished for the purpose of illustration, are not to be construed as limiting. Thus, for example, in a reaction product of a copper salt and a triamine, the copper may coordinate with two nitrogen atoms of one triamine molecule, and one or two nitrogen atoms of another triamine molecule. Accordingly, the applicant does not wish to be limited by the above speculative structures.

The present copper coordination complexes are the products of reaction of a copper salt with an N-alkenyl-alkylenepolyamine containing from three to five nitrogen atoms, separated by alkylene chains of from two to three carbon atoms, wherein the alkenyl group contains from eight to eighteen carbon atoms. Copper salts useful in preparing the novel complexes of the invention include, e.g., inorganic salts such as copper cyanide, copper thiocyanate, copper sulfate, copper thiosulfate, copper carbonate, copper nitrate, basic copper nitrite, copper hydroxide, copper chlorate, copper halides, e.g., cupric chloride, cupric bromide, or cupric fluoride, or cuprous halides such as cuprous chloride, etc., as well as copper salts of organic acids, such as copper acetate, copper butyrate, copper phenolate, etc. If desired, complexes may be prepared wherein the anion is a complex cuprocyanide, e.g., $(Cu(CN)_2)^{-2}$; generally, such salts may be prepared by addition of a cyanide such as potassium cyanide to a solution of the copper salt and an alkenylalkylenepolyamine.

The presently useful N-alkenylalkylenepolyamines are prepared by contacting an alkenyl halide with an alkylenepolyamine substantially as described in the copending application of Thomas E. Lesslie and Robert J. O'Neill, S.N. 438,341, filed June 21, 1954, now abandoned, assigned to the same assignee as the present application. Examples of presently useful N-alkenylalkylenepolyamines from which the novel copper coordination complexes of the invention may be prepared are, e.g., N - decenyldiethylenetriamine, N - dodecenyldiethylenetriamine, N - tetradecenyldiethylenetriamine, N - hexadecenyldiethylenetriamine, N - decenyltetraethylenepentamine, N - dodecenyltriethylenetetramine, N - tetradecenyltriethylenepentamine, N - hexadecenyltriethylenepentamine, etc. Particularly preferred in the present application are the N-alkenylalkylenepolyamines prepared by reacting a halide of an alkylene polymer such as a propylene or isobutylene trimer, tetramer, etc., with an alkylenepolyamine. Such N-alkenylalkylenepolyamines may be described, for example, as N - (tripropenyl)diethylenetriamine, N - (tetrapropenyl)triethylenetetramine, N - (pentapropenyl)diethylenetriamine, N - (triisobutenyl)-diethylenetriamine, N - (triisobutenyl)triethylenetetramine, etc.

The present novel compounds may be described generically as chelated N-alkenylalkylenepolyamine copper-(II) coordination complexes. Inasmuch as primary and secondary amino nitrogen have a strong affinity for copper atoms in the formation of the present complexes, the present reaction products of a copper salt and an N-alkenyltetraalkylenepentamine or an N-alkenyltrialkylenetetramine are probably complexes wherein the coordination positions of the copper atom are satisfied by covalent bonds to amino nitrogen atoms and the complex copper polyamine cations are ionically bonded to anions producing a valence of −2. Thus, for example, representative pentamine complex salts included in the scope of the present invention may be described, for example, as N-octenyltetraethylenepentamine copper(II) chloride, N-nonenyltetraethylenepentamine copper(II) chloride, N-decenyltetraethylenepentamine copper(II) chloride, N-decenyltetraethylenepentamine copper(II) nitrate, N-dodecenyltetraethylenepentamine copper(II) nitrate, N-hexadecenyltetraethylenepentamine copper(II) chloride, N-tetradecenyltetraethylenepentamine copper(II) nitrate, N-hexadecenyltetraethylenepentamine copper(II) sulfate, N-dodecenyltetraethylenepentamine copper(II) cyanide, N-(tetrapropenyl)tetraethylenepentamine copper(II) nitrate, N-(tetrapropenyl)tetraethylenepentamine copper-(II) carbonate, N-(tetrapropenyl)tetraethylenepentamine copper(II) acetate, N-(tripropenyl)tetraethylenepentamine copper(II) chlorate, N-(tetrapropenyl)tetraethylenepentamine copper(II) bromide, N-(triisobutenyl)-tetraethylenepentamine copper(II) chloride, N-hexadecenyltetraethylenepentamine copper(II) nitrate, N-hexadecenyltetraethylenepentamine copper(II) iodide, N-decenyltetraethylenepentamine copper(II) fluoride, N-hexadecenyltetraethylenepentamine copper(II) thiocyanate, etc. Typical trialkylenetetramine coordination complexes which may be prepared in accordance with the present invention are, for example, N-octenyltriethylenetetramine copper(II) butyrate, N-decenyltriethylenetetramine copper(II) chloride, N-tetradecenyltriethylenetetramine copper(II) nitrate, N-tetradecenyltriethylenetetramine copper(II) bromide, N-hexadecenyltriethylenetetramine copper(II) chloride, N-octadecenyltriethylenetetramine copper(II) chloride, N-dodecenyltriethylenetetramine copper(II) cuprocyanide, N-tetradecenyltriethylenetetramine copper(II) phenolate, N-hexadecenyltriethylenetetramine copper(II) sulfate, N-dodecenyltriethylenetetramine copper(II) sulfate, N-(tetrapropenyl)triethylenetetramine copper(II) nitrate, N-(tripropenyl)triethylenetetramine copper(II) nitrate, N-(pentapropenyl)triethylenetetramine copper(II) nitrate, N-(tetrapropenyl)triethylenetetramine copper(II) sulfate, N-(tetrapropenyl)triethylenetetramine copper(II) carbonate, N-(tetrapropenyl)triethylenetetramine copper(II) chloride, N-(triisobutenyl)triethylenetetramine copper(II) nitrate, N-(tetraisobutenyl)triethylenetetramine copper(II) sulfate, etc.

As explained above, the coordination complexes of copper salts with polyamines containing less than four amino nitrogen atoms may vary in composition, ranging from unionized complexes wherein two univalent ions are bonded by covalent bonds to a copper atom chelated with a triamine, through univalent cationic chelated copper complex salts with univalent anions, to divalent copper coordination complex salts with anions producing a valence of −2. Accordingly, I prefer to describe these coordination complexes by reference to the copper salts and alkylenepolyamines from which they are prepared. Thus, for example, from the present N-alkenyldialkylenetriamines and copper salts, there may be prepared, e.g., the chelate coordination complex of copper nitrate and N-octenyldiethylenetriamine, the chelate coordination complex of copper nitrate and N-decenyldiethylenetriamine, the chelate coordination complex of copper nitrate and N-tetradecenyldiethylenetriamine, the chelate coordination complex of copper nitrate and N-hexadecenyldiethylenetriamine, the chelate coordination complex of copper nitrate and N-octadecenyldiethylenetriamine, the chelate coordination complex of copper thiocyanate and N-dodecenyldiethylenetriamine, the chelate coordination complex of copper sulfate and N-hexadecenyldiethylenetriamine, the chelate coordination complex of copper propionate and N-tetradecenyldiethylenetriamine, the chelate coordination complex of basic copper nitrite and N-hexadecenyldiethylenetriamine, the chelate coordination complex of copper chlorate and N-tetradecenyldiethylenetriamine, the chelate coordination complex of cupric chloride and N-hexadecenyldiethylenetriamine, the chelate coordination complex of cupric bromide and N-tetradecenyldiethylenetriamine, the chelate coordination complex of cupric sulfate and N-(tetrapropenyl)diethylenetriamine, the chelate coordination complex of cupric nitrate and N-(tetrapropenyl)diethylenetriamine, the chelate coordination complex of copper chloride and N-(tetrapropenyl)diethylenetriamine, the chelate coordination complex of copper nitrate and N-(tripropenyl)diethylenetriamine, the chelate coordination complex of cupric sulfate and N-(tripropenyl)diethylenetriamine, the chelate coordination complex of cupric nitrate and N-(triisobutenyl)diethylenetriamine, etc.

The novel coordination complexes of the invention are prepared by contacting an inorganic copper salt with the presently useful N-alkenylalkylenepolyamines. Generally, the complexes are conveniently prepared in the liquid phase. The presently useful amines are for the most part liquids, soluble in organic solvents, slightly soluble in water. It is usually convenient to prepare the present compounds in the presence of solvents or diluents, e.g., by contacting the polyamine with a solution of the copper salt. Examples of useful solvents in the present process are, e.g., water, alcohols, such as ethanol or methanol, ethers, such as dioxane or tetrahydrofuran, etc. The proportions of copper salt to polyamine are suitably adjusted depending on the number of amino nitrogen atoms available in the polyamine to coordinate with the copper; thus, e.g., one mole of a cupric salt may be reacted with one mole of an N-alkenyldialkylenetriamine, trialkylenetetramine or tetraalkylenepentamine. An excess of the more readily available component, e.g., the copper salt, may be used if desired, so as to insure more complete utilization of the less readily available component. Generally, the present reaction goes readily at room temperature, and pressure and catalysts are not necessary. If desired, elevated temperatures, e.g., up to about 60° C., may be applied to accelerate the reaction. The formation of the complex is usually evidenced by a change in color of the reaction mixture, which typically turns a deep blue to purple shade, although cuprocyanide salts of the present complex may tend to red shades. The complex products are isolated, for example, by evaporation of the solvent, precipitation, e.g., by addition of an organic liquid to an aqueous reaction medium, etc.; care should be taken in dehydration of the products, since it has been found that both the nitrate and other salts, such as the acetate, may evidence a tendency to explode on drying, when large batches are handled.

The preparation of the present chelate coordination complexes is illustrated by the following, non-limiting example:

Example 1

The amine used to prepare the present copper salt was a product of condensation of diethylenetriamine with a $C_{12}$ olefin chloride made by treating a tetramer of propylene, containing an olefinic bond, with hypochlorite, whereby a chlorine atom is substituted for a hydrogen atom of the hydrocarbon chain, as described more fully, e.g., in the application of Thomas E. Lesslie and Robert J. O'Neill, S.N. 438,342, filed June 21, 1954, assigned to the same assignee as the present application. The substituted amine will be referred to hereinafter as N-(tetrapropenyl)diethylenetriamine. It has a molecular weight of 270.

To a solution of 24 g. of copper nitrate trihydrate in 300 ml. of ethanol were slowly added 27 g. of the aforesaid N-(tetrapropenyl)diethylenetriamine, with constant stirring. The solution turned dark blue and a blue-white precipitate separated. The supernatent solution was decanted and evaporated to dryness, leaving the water-soluble N-(tetrapropenyldiethylenetriamine copper(II) nitrate complex, which was found by analysis to contain 42.67% carbon, and 7.87% hydrogen (copper N-(tetrapropenyl)diethylenetriamine nitrate requires 42% carbon, 7.6% hydrogen).

Similarly, by reaction of cupric sulfate and N-(tetrapropenyl)triethylenetetramine in aqueous solution, followed by filtration and evaporation of the reaction mixture, N-(tetrapropenyl)triethylenetramine copper(II) sulfate is prepared. By reaction of copper nitrate with N-tetradecenyldiethylenetriamine or N-(tetraisobutenyl)-diethylenetriamine, there are prepared the corresponding copper chelate coordination complexes of N-tetradecenyl- and N-(tetraisobutenyl)diethylenetriamine, etc.

The present compounds are water-soluble complex salts which are generally solid materials. They may be used, for example, as aqueous emulsion polymerization catalysts, as pharmaceuticals, and as agricultural pesticides. It has been found that the present copper salts are potent biological toxicants and may be used, e.g., to eliminate nematodes and other undesired harmful organisms infesting soils, and for the retardation and prevention of the growth of molds and other fungi on organic materials.

The highly potent fungicidal effects of the present compounds are surprising, since they are much greater than would have been predicted from the sum of the activities of the present N-alkenylalkylenepolyamines, the fungicidal activity of which is not generally great at very low concentrations, and of copper salts, which vary in fungicidal effectiveness, and not all of which are to any degree fungitoxic—thus, for example, copper carbonate has been reported to be devoid of fungicidal action. The present copper chelate coordination complexes with N-alkenyl-alkylenepolyamines may be usefully applied, e.g., to cotton or wool textiles or to furs and leather goods for the prevention of the deterioration thereof due to fungal attack; they are particularly advantageously applied as agricultural fungitoxicants, since it has surprisingly been found that the novel copper salts of the invention possess a very low phytotoxicity. In agricultural fields, the present compounds are highly efficacious for the prevention and retardation of fungus growth on plants, seeds, fruits, etc.

The copper chelates of the present invention may be applied directly to the surface to be protected, e.g., by mixing the powdered compound with, for example, plant seeds subject to attack by soil microorganisms. Alternatively, a powdered carrier such as talc, bentonite, etc., may be employed in the application of the present complexes to seeds, soils, plants, etc. Since the present compounds are water-soluble, aqueous solutions of the complexes of the invention may be prepared to give effective and economical formulations which may be applied in impregnating baths or as sprays on textiles, fruits, tubers, soils, etc. for the prevention of fungal attack. In treatment of plants for the control or eradication of fungus diseases, aqueous solutions of the present compounds may be sprayed onto the foliage thereof; particularly useful in the treatment of plants and fruits are aqueous emulsions or dispersions of these copper complexes, prepared by adding a wetting agent to an aqueous solution of the copper compound. Examples of suitable wetting agents are, e.g., sulfates of long-chain alcohols, such as octadecanol, sulfonated amide and ester derivatives, sulfonated aromatic and mixed alkyl aryl sulfonate derivatives, esters of fatty acids, such as the recinoleic acid ester of sorbitol, and petroleum sulfonates of $C_{10}$ to $C_{20}$ carbon chains. The nonionic emulsifying agents such as the reaction products of ethylene oxide and alkylated phenols may also be used as wetting agents. The aqueous emulsions of the present compounds may also suitably include compounds which facilitate the adherence of the active fungitoxic compounds to the surfaces sprayed, i.e., sticking agents such as oils, e.g., fish oils, etc., and the aqueous solutions, emulsions, or powdered formulations containing the novel copper chelates of the invention as active ingredients may also include other biologically active chemical compositions such as fertilizers or pesticidal compounds, e.g., insecticides, etc. The effective concentration for application to the foliage of plants varies with the intensity of fungal attack and the surface area to be treated. A typical spray may contain, e.g., from 500 or less to 5000 or more parts per million of active compound. Application of the present compound is illustrated by the following examples:

Example 2

This example illustrates fungistatic effects of the present compounds.

A mixture was prepared of 18 ml. of melted Sabouraud's Dextrose agar and 2 ml. of a solution of 100 mg. of the compound of Example 1 in 10 ml. of water. The agar, after it had cooled and hardened, was inoculated with spores of *Aspergillus niger*, and incubated for five days at 25° C. It was found that growth of the *A. niger* fungus was completely inhibited by this concentration of the copper salt.

An 0.1% aqueous solution of the N-(tetrapropenyl)diethylenetriamine copper(II) nitrate of Example 1 was prepared; 0.02 ml. of this solution was pipetted into each well of a slide and allowed to evaporate to dryness. Then, 0.1 ml. portions of spore suspensions containing 50,000 spores per ml. of *Stemphylium Sarcinaeforme* and *Monolinia fructicola* were added to respective wells of the slide, after which the slides were placed in petri dishes containing water and allowed to incubate for about 24 hours under moist conditions. The germination of the spores was completely inhibited by this concentration of the present chelate.

*Example 3*

This example illustrates the eradication of a fungus infection on plant foliage.

Ten six-day old seedlings of a rust-susceptible variety of wheat (Seneca) were inoculated with spores of the wheat rust, *Puccinia rubigo-vera tritici*, after which they were sprayed with water and held in incubation chambers for 36 to 48 hours at 70° F. and 100% humidity. The wheat plants were then transferred to greenhouse benches for a further 48 hours, after which they were sprayed with 20 ml. of a 0.5% solution of the N-(tetrapropenyl)-diethylenetriamine copper(II) nitrate of Example 1, prepared by adding 100 mg. of this chemical to 20 ml. of water containing 0.1 ml. of a wetting agent. The seedlings were then held for a week on greenhouse benches, after which the effectiveness of the treatment was evaluated. It was found that the severity of the rust infection was considerably reduced by this treatment, as compared to the condition of control plants similarly treated with the exception of application of the present copper chelates.

*Example 4*

This example illustrates the protection of seeds against fungus attack.

Pea seeds were tumbled with solid powdered N-(tetrapropenyl)diethylenetriamine copper(II) nitrate at a concentration of 0.125% of the chemical based on the weight of the seed. After this, the treated seeds, together with an equal number of untreated pea seeds, were planted in soil infested with such soil-borne fungi as Pythium, Fusarium, Rhizoctonia, etc. The soil containing the pea seeds was incubated at a high moisture level at a temperature of 60 to 65° F. for ten days, after which the condition of the plants and percent germination were recorded. It was found that very good control of fungus infection had been obtained by this treatment, the major part of the copper-complex-protected seeds having germinated and emerged as healthy plants, whereas the control, untreated seeds had been overcome by a damping-off fungus infection, and almost completely failed to germinate.

*Example 5*

This example illustrates the protection of plant foliage against fungal attack using the present copper salts.

Aqueous dispersions containing 1250, 625, and 312 parts per million of the compound of Example 1, respectively, were prepared and sprayed onto four- to five-week-old Bonny Best variety tomato plants having four true leaves, two plants being sprayed at each concentration. The plants were then placed on a greenhouse bench for two days, after which they were inspected and it was found that no phytotoxic effects were evident at any of the concentrations. The tomato plants were then plcaed in an incubator at 70° F. and sprayed with a spore suspension of *Stemphylium solani*, the incitant of tomato leaf spot. Two days later, the plants were inspected, and it was found that complete control of the leaf spot infection had been obtained at even the lowest concentration.

By contrast, when the chelate coordination complex of equimolar parts of ethylenediamine and copper chloride was similarly applied to tomato plants, this copper salt was found to be too phytotoxic for the fungistatic test to be carried ou at a concentration of 1250 p.p.m., while at 625 p.p.m., no evidence of control of the fungus infection could be detected.

Testing of the copper nitrate-N-(tetrapropenyl)diethylenetriamine chelate coordination complex against bean powdery mildew proved that the present compound gave very good control of the mildew infection at 625 parts per million.

The compound of Example 1 was tested for phytotoxicity and found to be innocuous to plants of both broad and narrow leaf species at concentrations as high as 25 lbs. per acre. This compound was then brought to field testing as a foliage protectant against potato blight, and it was found that again, very good protective activity was exhibited by the copper nitrate coordination complex of the N-(tetrapropenyl)diethylenetriamine.

Although this invention has been described with reference to certain specific embodiments thereof, it is to be understood that various modifications and adaptations of the arrangements herein disclosed may be made as readily occur to persons skilled in the art without constituting a departure from the spirit and scope of the invention as defined in the appended claims.

What is claimed is:

1. Copper chelate coordination complexes with N-alkenylalkylenepolyamines containing from three to five amino nitrogen groups separated by alkylene chains of from two to three carbon atoms, wherein the alkenyl radical contains from eight to eighteen carbon atoms.

2. Copper chelate coordination complexes of N-alkenyldiethylenetriamines wherein the alkenyl radical contains from eight to eighteen carbon atoms.

3. Copper chelate coordination complexes of N-alkenyltriethylenetetramines wherein the alkenyl radical contains from eight to eighteen carbon atoms.

4. Copper chelate coordination complexes of an N-(tetrapropenyl)diethylenetriamine.

5. The chelate coordination complex of substantially equimolar amounts of copper nitrate and an N-(tetrapropenyl)diethylenetriamine.

6. A fungicidal composition comprising an inert carrier and as the essential effective ingredient, a copper chelate coordination complex with an N-alkenylalkylenepolyamine containing from three to five amino nitrogen groups separated by alkylene chains of from two to three carbon atoms, wherein the alkenyl radical contains from eight to eighteen carbon atoms.

7. A fungicidal composition comprising an inert carrier and as the essential effective ingredient, the chelate coordination complex prepared by reacting substantially equimolar amounts of copper nitrate and an N-(tetrapropenyl)diethylenetriamine.

8. A fungicidal composition comprising an aqueous solution of a copper chelate coordination complex with an N-alkenylalkylenepolyamine containing from three to five amino nitrogen groups separated by alkylene chains of from two to three carbon atoms, wherein the alkenyl radical contains from eight to eighteen carbon atoms.

9. A fungicidal composition comprising an aqueous solution of a chelate coordination complex prepared by reacting substantially equimolar amounts of copper nitrate and N-tetrapropenyl)diethylenetriamine.

10. The method of protecting organic material susceptible to attack by fungi which comprises applying to the said organic material, in amounts sufficient to protect the said organic material from fungicidal attack, a copper chelate coordination complex with an N-alkenylalkylenepolyamine containing from three to five amino nitrogen groups separated by alkylene chains of from two to three carbon atoms, wherein the alkenyl radical contains from eight to eighteen carbon atoms.

11. The method of protecting organic material susceptible to attack by fungi which comprises applying to the said organic material, in amounts sufficient to protect the said organic materials from fungicidal attack, the chelate coordination complex prepared by reacting substantially equimolar amounts of copper nitrate and an N-(tetrapropenyl)diethylenetriamine.

12. The method of inhibiting the development of fungi on living plants which comprises applying to the said plants a fungus-inhibiting quantity of a copper chelate coordination complex with an N-alkenylalkylenepolyamine containing from three to five amino nitrogen groups separated by alkylene chains of from two to three carbon atoms, wherein the alkenyl radical contains from eight to eighteen carbon atoms.

13. The method inhibiting the development of fungi on living plants which comprises applying to the said plants a fungus-inhibiting quantity of a chelate coordination complex prepared by reacting equimolar amounts of copper nitrate and an N-(tetrapropenyl)diethylenetriamine.

References Cited in the file of this patent

UNITED STATES PATENTS

| | | |
|---|---|---|
| 2,172,822 | Tamele et al. | Sept. 12, 1939 |
| 2,208,253 | Flenner et al. | July 16, 1940 |
| 2,305,545 | Migrdichian | Dec. 15, 1942 |
| 2,305,546 | Migrdichian | Dec. 15, 1942 |
| 2,521,424 | Swaney et al. | Sept. 5, 1950 |
| 2,615,908 | McCauley et al. | Oct. 28, 1952 |
| 2,651,648 | Meyer | Sept. 8, 1953 |
| 2,686,798 | Gmitter | Aug. 17, 1954 |
| 2,695,911 | Kuhn et al. | Nov. 30, 1954 |